United States Patent
Ji et al.

(10) Patent No.: US 9,477,398 B2
(45) Date of Patent: Oct. 25, 2016

(54) TERMINAL AND METHOD FOR PROCESSING MULTI-POINT INPUT

(71) Applicant: Samsung Electronics Co., Ltd., Gyeonggi-do (KR)

(72) Inventors: Daehyun Ji, Gyeonggi-do (KR); Joonwoo Kim, Gyeonggi-do (KR); Dongcheol Baek, Seoul (KR); Taekeun Oh, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 48 days.

(21) Appl. No.: 14/027,454

(22) Filed: Sep. 16, 2013

(65) Prior Publication Data

US 2014/0098041 A1    Apr. 10, 2014

(30) Foreign Application Priority Data

Oct. 5, 2012 (KR) ........................ 10-2012-0110628

(51) Int. Cl.
*G06F 3/0488* (2013.01)
*G06F 3/0354* (2013.01)
*G06F 3/041* (2006.01)

(52) U.S. Cl.
CPC ......... *G06F 3/0488* (2013.01); *G06F 3/03545* (2013.01); *G06F 3/0416* (2013.01); *G06F 3/04883* (2013.01)

(58) Field of Classification Search
None
See application file for complete search history.

(56) References Cited

U.S. PATENT DOCUMENTS

| | | |
|---|---|---|
| 2008/0012835 A1 | 1/2008 | Rimon et al. |
| 2009/0284495 A1 | 11/2009 | Geaghan et al. |
| 2010/0095205 A1 | 4/2010 | Kinoshita |
| 2010/0182247 A1 | 7/2010 | Petschnigg et al. |
| 2010/0295810 A1 | 11/2010 | Nagata et al. |
| 2011/0254806 A1 | 10/2011 | Jung et al. |
| 2011/0298748 A1 | 12/2011 | Chen et al. |
| 2012/0162093 A1 | 6/2012 | Buxton et al. |
| 2012/0176343 A1 | 7/2012 | Holmgren et al. |
| 2012/0256880 A1* | 10/2012 | Han et al. ............. 345/175 |
| 2012/0262407 A1* | 10/2012 | Hinckley et al. ...... 345/173 |

FOREIGN PATENT DOCUMENTS

| | | |
|---|---|---|
| EP | 2 159 670 A2 | 3/2010 |
| EP | 2 363 789 A2 | 9/2011 |
| JP | 2011-164746 A | 8/2011 |
| KR | 10-2011-0015585 A | 2/2011 |
| WO | 2011/023225 A1 | 3/2011 |
| WO | 2012-115296 A1 | 8/2012 |

OTHER PUBLICATIONS

European Search Report dated Jul. 25, 2016.

* cited by examiner

*Primary Examiner* — Joseph Haley
(74) *Attorney, Agent, or Firm* — Cha & Reiter, LLC.

(57) ABSTRACT

A terminal and method for discriminating among multipoint inputs generated in combination of multiple input factors generated by different input devices includes detecting a multipoint input comprising a plurality of input factors provided by a plurality of different input means; extracting coordinates and positions of the input factors based on the input means; and performing a particular operation corresponding to the extracted coordinates.

18 Claims, 15 Drawing Sheets

TERMINAL AND METHOD FOR PROCESSING MULTI-POINT INPUT

CLAIM OF PRIORITY

This application claims the benefit under 35 U.S.C. §119 (a) from an earlier Korean patent application filed on Oct. 5, 2012 in the Korean Intellectual Property Office and assigned Serial No. 10-2012-0110628, the entire disclosure of which is hereby incorporated by reference.

BACKGROUND

1. Field of Invention

The present disclosure relates to a multipoint input-processing method and a terminal thereof and, in particular, to a terminal and method for efficiently discriminating among multipoint inputs generated by different input means.

2. Description of the Related Art

Touch input is a type of intuitive input manipulations that is readily available on mobile devices such as smart phones and tablet computers. If touch input is available, a user can use finger or other physical object such as s stylus pen to do many of the things you do with a mouse. For example, you can move the pointer on the screen, select objects, and open files and folders.

Recent research efforts are being concentrated in the area of discriminating touch inputs made by different types of input means. One approach to identify the type of the input means is to use different sensor pads sensitive or responsive to the respective input means. For example, in order to discriminate between inputs made by a finger and a stylus (or tablet pen), the terminal may be configured with both a finger touch sensitive pad and a pen touch sensitive pad.

However, when multipoint inputs are realized by a combination of touch inputs generated by different input means, the conventional multipoint input-enabled terminal merely recognizes inputs made by only one type of input means and excludes inputs made by other types of input means for processing. For example, referring to FIG. 1, if a multipoint input occurred by a combination of the finger and pen inputs is detected by the first and second input pads 1 and 2, the terminal rejects the finger touch input and only processes the pen touch input.

Accordingly, the conventional multipoint input-enabled terminal cannot discriminate between the finger touch and the pen touch inputs during operation, thus resulting in a lack of multipoint input functionality using different input means.

SUMMARY

The present invention has been made in an effort to solve the above problem and also provides additional advantages, by providing a terminal and method for identifying a multipoint input and discriminating among the touches which are made by different types of input means, and performing a specific action in response to the identified multipoint inputs.

Another aspect of the present invention is to provide a terminal and method for identifying a multipoint input that is capable of filtering unintended input by discriminating the touch inputs detected on the input pad using a rejection region defined on the input pad according to predetermined criteria.

In accordance with an aspect of the present invention, a method for processing a multipoint input includes: detecting a multipoint input including a plurality of input factors generated by a plurality of different input means; extracting coordinates of the input factors based on the input means and positions of the input factors; and performing a specific operation corresponding to the extracted coordinates.

In accordance with another aspect of the present invention, a terminal includes: an input unit which detects a multipoint input including multiple input factors generated by different input means; and a control unit which extracts coordinates and positions of the input factors generated by the input means and performs a specific operation corresponding to the extracted coordinates.

DETAILED DESCRIPTION

The present invention is applicable for detecting multipoint inputs and operating a terminal by manipulating different multipoint inputs. It should be noted that the teachings of the present invention can be applied to all the types of the devices capable of multipoint input as well as normal electronic devices including smart phone, portable terminal, mobile terminal, Personal Digital Assistant (PDA), Portable Multimedia Player (PMP), laptop computer, Note Pan, Wibro terminal, tablet PC, smart TV, smart refrigerator, etc.

In the following description, the term "multipoint input" denotes an input made by a combination of at least two different input means, such as finger contacts or a stylus pen and/or manipulation button included in the stylus pen, that can be generated simultaneously or sequentially in any combination of order.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Hereinafter, exemplary embodiments of the present invention are described with reference to the accompanying drawings in detail.

Figure 1:
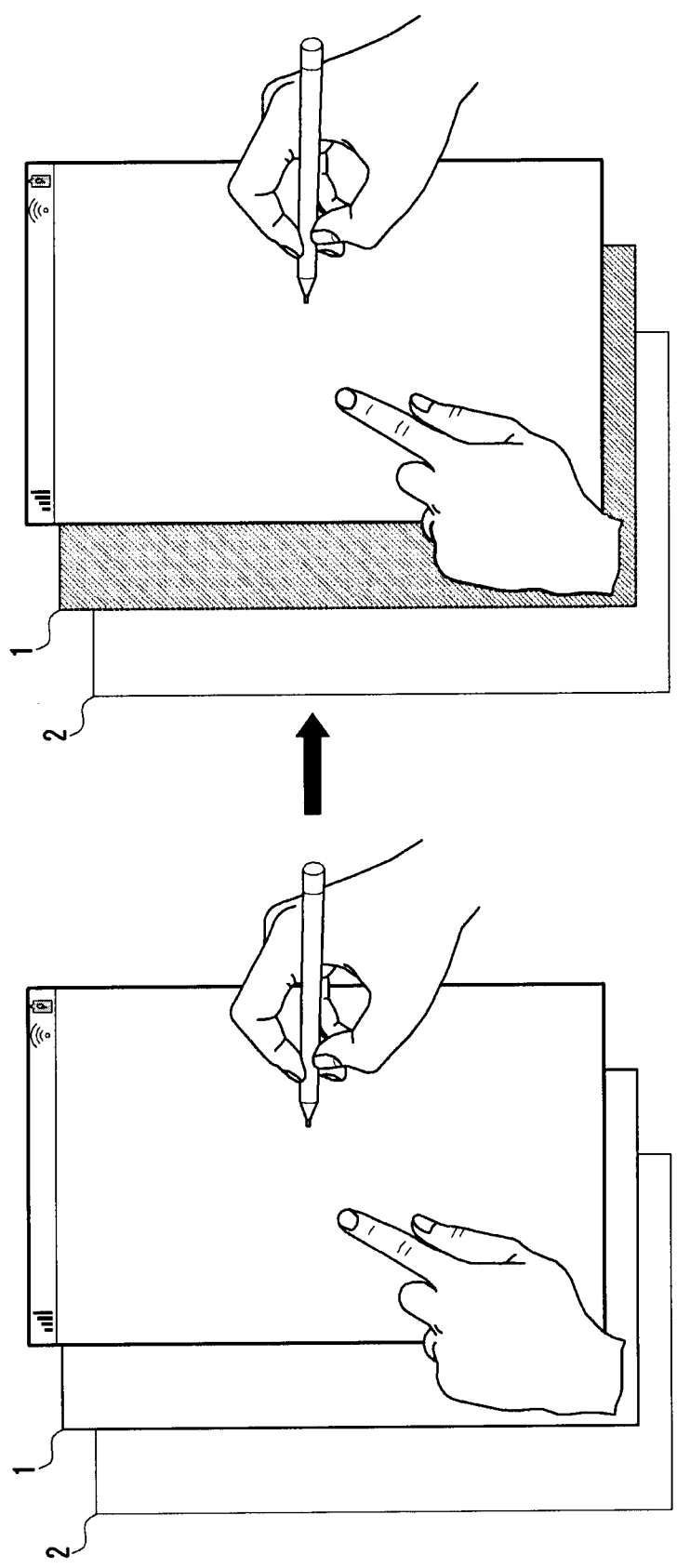
FIG. 1 is a diagram illustrating a conventional multipoint input recognition mechanism.
Figure 2:
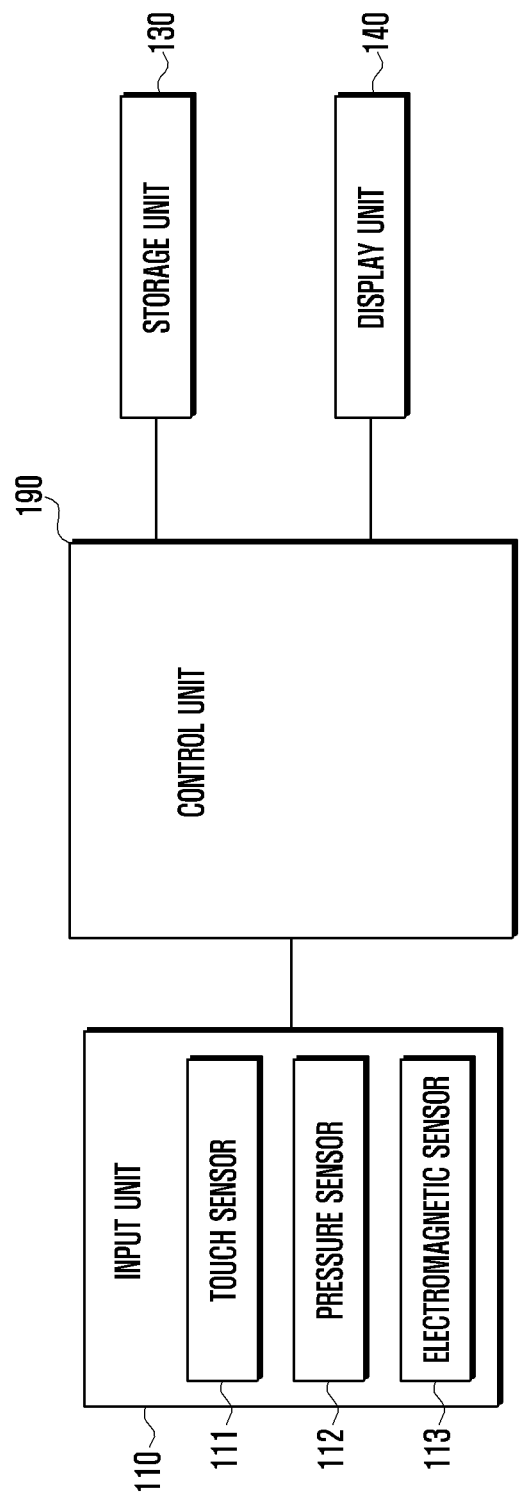
FIG. 2 is a block diagram illustrating a configuration of the terminal for recognizing a multipoint input according to an embodiment of the present invention.

FIG. 2 is a block diagram illustrating a configuration of the multipoint input-enabled terminal according to an embodiment of the present invention.

As shown, the terminal 100 includes an input unit 110, a control unit 120, a storage unit 130, and a display unit 140.

The input unit 110 includes a touch sensor 111, a pressure sensor 112, and an electromagnetic sensor 113.

The touch sensor 111 is capable of sensing touch inputs made by the user. The touch sensor 111 can be implemented in the form of a touch film, a touch sheet, or a touchpad. The touch sensor 111 is capable of sensing the touch input and transferring the corresponding touch signal to the control unit 120. The control unit 120 in turn analyzes the touch signal to take an action corresponding to the touch signal. The information corresponding to the touch signal can be displayed on the display unit 140.

The touch sensor 111 is further capable of receiving the manipulation signal in the form of a touch input made by means of various input means. The touch sensor 111 is capable of receiving the manipulation signal input by means of the user's body (e.g. finger) or a physical object such as stylus pen and/or manipulation button included in the stylus pen. Depending on the implementation, the touch sensor 111 is capable of sensing the approach of an object within a specific range on the touching surface, as well as touch of the object, as an input.

The pressure sensor 112 is capable of sensing the presence of pressure applied to the terminal and the level of the pressure. The pressure sensor 112 can be installed at an appropriate location where it is necessary to sense the pressure applied to the terminal 100 during operation. If the pressure sensor 112 is installed on the display unit 140, it is possible to identify the input made on the display unit 140 according to the signal output by the pressure sensor 112.

The electromagnetic sensor 113 is capable of sensing the touch or approach of an object according the change in the electromagnetic field. The electromagnetic sensor 113 can be configured with a coil producing magnetic field so as to detect the approach of an object having a resonant circuit changing the energy of the magnetic field produced by the electromagnetic sensor 113. The object having the resonant circuit can be a stylus pen. The magnetic sensor 113 is capable of sensing the approach and hovering of an object to the terminal 100 as well as the contact to the terminal 100.

The input unit 110 can be implemented with an input pad. The input unit 110 can be implemented such that the touch sensor 111, pressure sensor 112, and the electromagnetic sensor 113 are mounted on the input pad. The input unit 110 also can be implemented such that the touch sensor 111 or the pressure sensor 112 is laminated on the input pad in the form of a film or layered over the input pad in the form of a panel. The input unit 110 is also capable of being implemented in the form of Electro Magnetic Resonance (EMR) or Electro Magnetic Interference (EMI) type input pad. The input unit 110 is also capable of being implemented with at least one input pad interlayered for detecting an input using a plurality of sensors.

The input unit 110 can be layered with the display unit 140 so as to operate in the form of an input screen. For example, the input unit 110 is capable of including an input pad having the touch sensor 111 and forming a Touch Screen Panel (TSP) combined with the display unit 140. The input unit 110 is also capable of including an input pad having the electromagnetic sensor 113 and being combined with the display unit 140 implemented in the form of a display panel.

Figure 3:
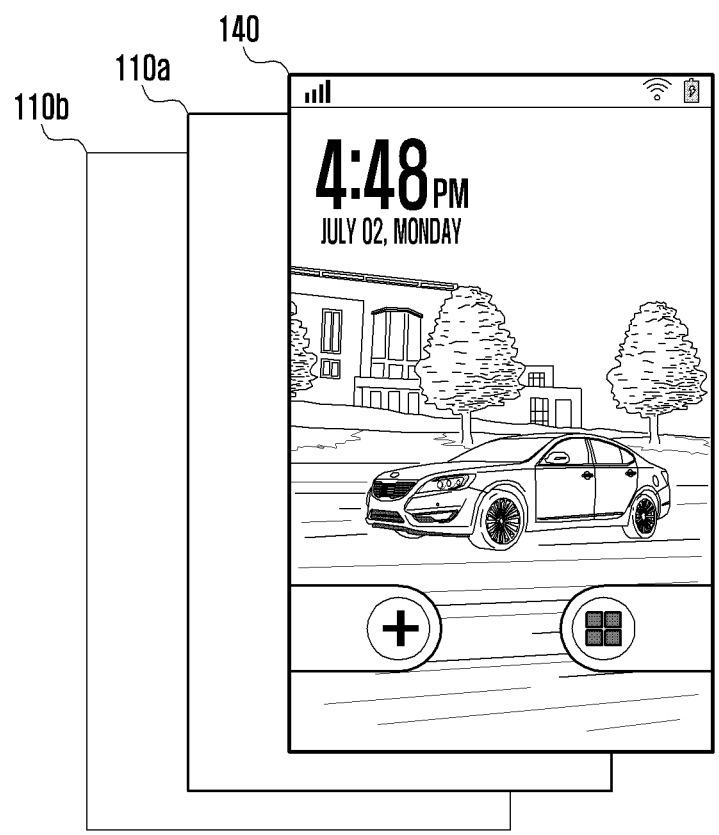
FIG. 3 is a diagram illustrating a configuration of the input unit of the terminal of FIG. 2.

Referring to FIG. 3, the input unit 110 is capable of being implemented with the first input pad 110a and the second input pad 110b that are interlayered with each other. Each of the first and second input pads 110a and 110b can be a touchpad including a touch sensor 111, a pressure pad including the pressure sensor 112, an electromagnetic pad including the electromagnetic sensor 113, or an EMR pad. The first and second input pads 110a and 110b can be configured to correspond to different types of input means and detect the inputs made by different input means. For example, the first input pad 110a can be configured as a touch pad to detect a touch input made by a human body part, while the second input pad 110b as EMR pad to detect an input made by a pen type object. The input unit 110 is capable of discriminating among the inputs sensed by the first and second input pads 110a and 110b.

The input unit 110 can be implemented so as to be layered with the display unit 140. The first and second input pads 110a and 110b can be placed below the display unit 140 so as to detect the input made by means of icons, menu items, and buttons presented on the display unit 140. The display unit 140 can be implemented in the form of a normal display panel or a TSP panel in combination with the input pad.

Although FIG. 3 is directed to an exemplary combination of the input unit 110 and the display 140, the type and number of the input pad of the input unit 110 and layering order of the input pad and display unit 140 can be varied according to the manufacturing technology of the terminal 100.

According to an embodiment of the present invention, the input unit 110 is capable of detecting multipoint inputs occurred by different input means. The input means can include the human body (i.e., finger) and physical object such as stylus pen. Thus, the multipoint input represents at least two input factors generated by the same type of input means or different types of input means.

The control unit 120 is capable of controlling the individual components for overall operations of the terminal 100. For example, the control unit 120 is capable of controlling the operations and function of the terminal 100 according to the multipoint input received through the input unit 110.

According to an embodiment of the present invention, the control unit 120 is capable of analyzing the multipoint input received by the input unit 110. The control unit 120 is capable of analyzing the positions of individual input factors constituting the multipoint input and types of the input means associated with the respective input factors. The control unit 120 is also capable of identifying the input means associated with the respective input factors and acquiring the coordinates of the input factor where they occurred. In detail, the control unit 120 is capable of positioning the input factors generated on the surface of the terminal 100 or at a distance from the terminal 100 in 2-dimensional or 3-dimensional coordinates. The control unit 120 is also capable of acquiring the coordinates in association with the type of the input means. Further, the control unit 120 is capable of acquiring the coordinates associated with the input means based on which input pad has sensed the input signal among multiple input pads of the input unit 110.

According to an embodiment of the present invention, the control unit 120 is capable of rejecting any of the acquired coordinates according to predetermined criteria. For example, the control unit 120 is capable of rejecting the coordinates of the input factor generated by means of the user's finger based on the coordinates of the input factor generated by means of the pen.

According to an embodiment of the present invention, the control unit 120 is capable of executing a specific operation corresponding to the extracted coordinates. For example, the control unit 120 is capable of performing at least one of the operations of zoom-in, zoom-out, drag, copy, shortcut icon presentation, menu presentation, pen-type switching (e.g. pen/eraser), and specific program/application execution. The storage unit 130 is capable of storing programs and commands associated with the operations of the terminal 100. The storage unit 130 may include at least one of flash memory type, hard disk type, multimedia card micro type, and card type memories (e.g. SD or XD memory cards), Random Access Memory (RAM), Static RAM (SRAM), Read-Only Memory (ROM), Electrically Erasable Programmable Read-Only Memory (EEPROM), Programmable Read-Only Memory (PROM), magnetic memory, magnetic disk, optical disk.

According to an embodiment of the present invention, the storage unit 130 is capable of storing the coordinates associated with the multipoint input temporarily or semi-persistently. The storage unit 103 is also capable of storing the information on the name of the program/application mapped to the coordinates, execution file path, related image, icon, UI, etc. The storage unit 130 is also capable of storing the coordinates in the form of the threshold ranges rather than specific values.

The display unit 140 displays (outputs) the information processed by the terminal 100. For example, the display unit 140 is capable of displaying the User Interface (UI) or Graphic User Interface (GUI) related to the voice detecting, situation recognition, and function control.

The display unit 140 may include at least one of Liquid Crystal Display (LCD), Thin Film Transistor LCD (TFT LCD), Organic Light Emitting Diode (OLED), flexible display, and 3-Dimensional (3D) display.

The display unit 140 is capable of being implemented with touchscreen in layered structured with the touch sensor constituting the input unit 110. At this time, the touchscreen-enabled display unit 140 is capable of operating as an input device.

According to an embodiment of the present invention, the display unit 140 is capable of displaying the input pattern or information corresponding to the multipoint input. The display unit 140 is also capable of displaying the screen showing the operation execution result of the control unit 120 in correspondence to the coordinates of the multipoint input.

Figure 4:
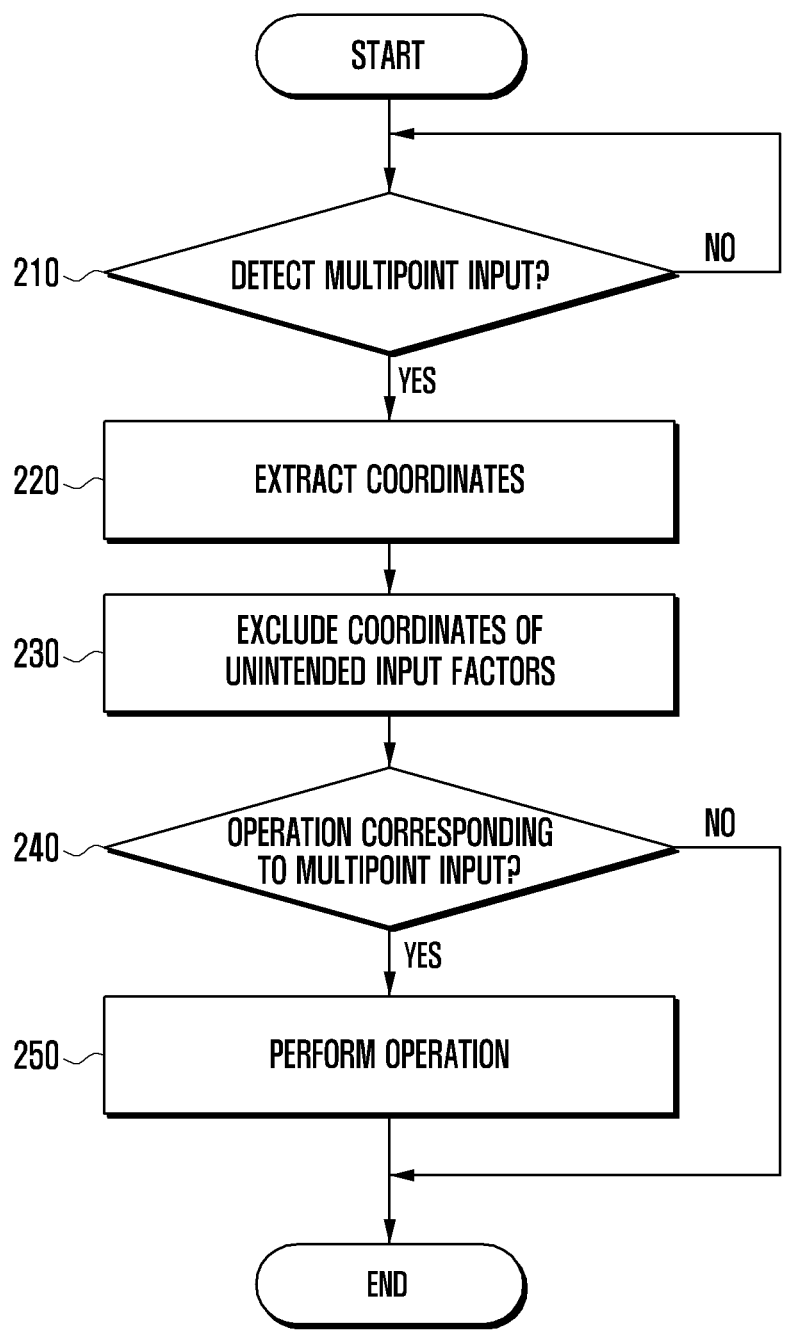
FIG. 4 is a flowchart illustrating a multipoint input processing method according to an embodiment of the present invention.

FIG. 4 is a flowchart illustrating a multipoint input sensing method according to an embodiment of the present invention.

The terminal 100 detects a multipoint input at step 210.

Figure 5:
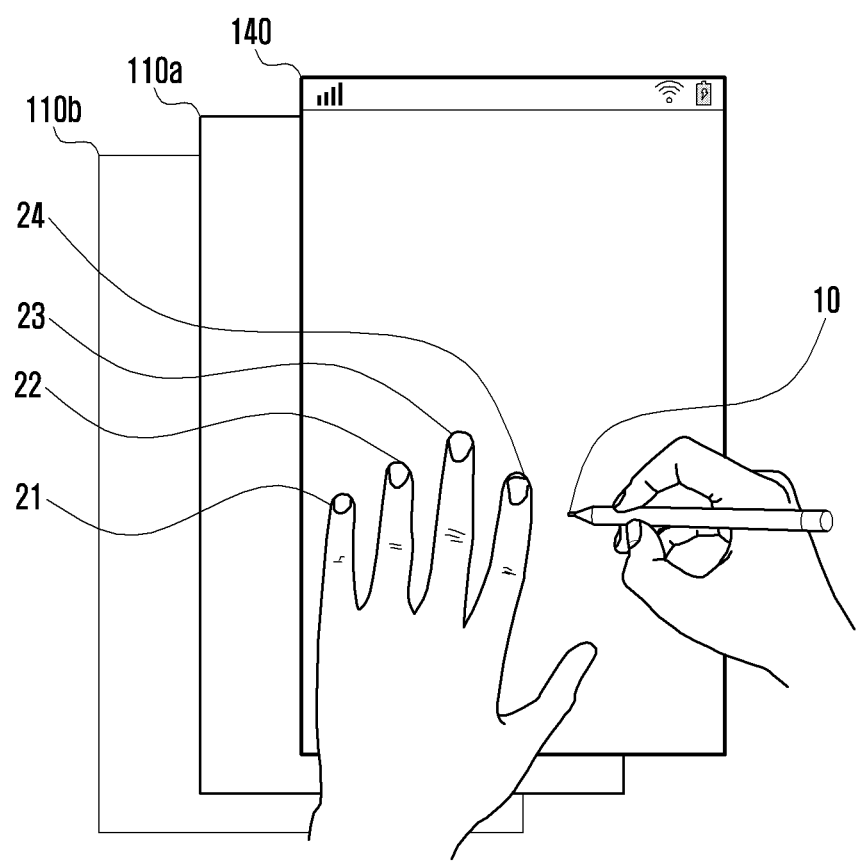
FIG. 5 is a diagram illustrating an exemplary multipoint input to the terminal of FIG. 2.

The multipoint input can include of a plurality of input factors generated by different input means. For example, the multipoint input can be four finger input factors 21 to 24 generated by a hand and a pen input factor generated by a stylus pen as shown in FIG. 5. Here, the input factors of the multipoint input can be generated by at least one of touch and proximity of the input means (i.e. finger, hand, stylus pen) generated in the form of pointing, click, drag, sweep, and other actions forming specific patterns. Further, the input factors of the multipoint input can be generated simultaneously or sequentially in any order. Referring to FIG. 5, the finger input factors 21 to 24 and the pen input factor 10 can be generated simultaneously or sequentially in any combination. For example, the multipoint input of FIG. 5 can be occurred in such a way that the finger input factors 21 to 24 are generated first and then the pen input factor 10 follows the finger input factors 21 to 24. In this case, the finger input factors 21 to 24 can be generated simultaneously or sequentially in any order.

The terminal 100 is capable of detecting the multipoint input through a plurality of input pads corresponding to input means respectively. As shown in FIG. 5, the terminal 100 is capable of being implemented with a plurality of layered input pads 110a and 110b. The input pads 110a and 110b correspond to the different input means. For example, the first input pad 110a may be reactive to the human body, i.e. finger, hand, while the second input pad 110b to the stylus pen. Hence, the terminal 100 is capable of detecting multiple finger input factors by means of the first input pad 110a and multiple pen input factors by means of the second input pad 110b. For example, the terminal 100 detects the four finger input factors 21 to 24 by means of the first input pad 110a and the pen input factor 10 by means of the second input factor 110b.

The terminal 100 is capable of discriminating among the touch input and proximity input factors of the multipoint input, and analyzing detailed gestures (e.g. pointing, click, drag, sweep and other gestures having specific patterns), occurrence positions, pressure levels, and interactions.

Accordingly, if a multipoint input is detected, the terminal 100 checks the coordinates of input factors at step 220 by extracting the coordinates of the respective input factors.

For example, the terminal 100 is capable of extracting the 2-Dimensional coordinates (x, y) of the position of each of the input factors constituting the multipoint input. In the case of the proximity input, the terminal 100 is capable of extracting the 3-Dimensional coordinates (x, y, z) including the coordinate corresponding to the distance from the terminal 100 to the input means (i.e. finger or pen) of the input factor.

In the embodiment, the terminal 100 is also capable of extracting the coordinates including an element indicating the input means of each of the input factors constituting the multipoint input. The terminal 100 can assign a number to the input means, respectively. The number may represent each of the input pads corresponding to each of the input means. The terminal 100 is capable of extracting the coordinates comprising the assigned number corresponding to the input means of each of the input factors. For example, the terminal 100 can assign 1 to the finger and 2 to the stylus pen. In this case, the terminal 100 can extract the coordinates of the input factors, made by the finger, including an element 1 for one of multiple-dimension. Similarly, the terminal 100 can extract the coordinates of the input factor, made by the stylus pen, including an element 2 for one of multiple-dimension.

Referring to FIG. 5, the terminal 100 is capable of extracting the coordinates of the finger input factors 21 to 24 detected by means of the first pad and the coordinates of the pen input factor 10 detected by means of the second pad. The terminal 100 is capable of assigning the value 1 for the finger input such that the coordinates of the finger input factors are expressed as (x1, y1, 1), (x2, y2, 1), (x3, y3, 1) and (x4, y4, 1). The terminal 100 is also capable of assigning the value 2 for the pen input such that the coordinates of the pen input factor is expressed as (x5, y5, 2).

The terminal 100 is also capable of assigning an index H for the finger input such that the coordinates of the finger input factors are expressed as H(x1, y1, 1), H(x2, y2, 2), H(x3, y3, 3), and H(x4, y4, 4), respectively. The terminal 100 is also capable of assigning an index P to the pen input factors such that the coordinates of the pen input factor are expressed as P(x5, y5, 1).

Alternatively, the terminal 100 is capable of assigning an index starting with H for the finger input such that the coordinates of the finger input factors are expressed as H1(x1, y1), H2(x2, y2), H3(x3, y3) and H4(x4, y5). The terminal 100 is also capable of assigning an index starting with P for the pen input such that the coordinates of the pen input factor are expressed as P1(x5, y5).

Although exemplary coordinate expression methods have described above, the coordinates can be expressed and detected in other various manners known to those skilled in the art according to the implementation of the present invention.

Next, the terminal 100 is capable of rejecting certain coordinates at step 230.

The terminal 100 is capable of rejecting at least one of the extracted coordinates. In detail, the terminal 100 is capable of at least one of the coordinates of the input factors generated by other input means, based on the coordinates of the input factors generated by a specific one input means, namely a criterion input means.

Figure 6:
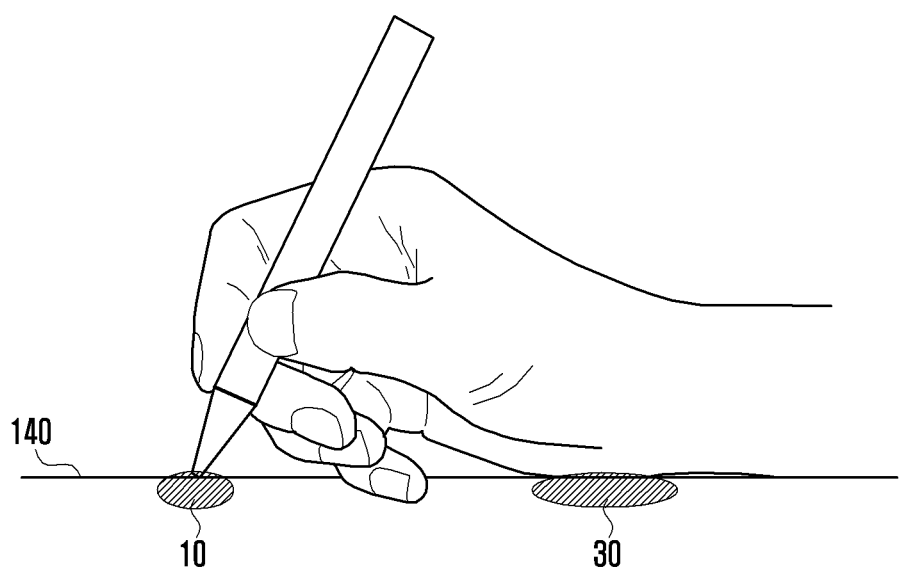
FIG. 6 is a diagram illustrating a principle of detecting a multipoint input according to an embodiment of the present invention.

For example, the terminal 100 is capable of rejecting the coordinates of at least one of the finger input factors based on the coordinates of the pen input factor. As shown in FIG. 6, when the user attempts generate the pen input factor 10 with the pen, the hand held the pen may contact the terminal so as to generate an unintended finger input factor 30. In this case, the unintended finger input factor 30 can be detected on a left or right side of the pen input factor 10 according to whether the user is a right-handed or a left-handed. In the case that the terminal 100 is configured to detect the input factors made by only one input means, i.e. pen, the unintended finger input factor 30 does not matter; however, in the case that the terminal 100 is configured to detect the input factors made by both the finger and pen, the unintended finger input factor 30 causes multipoint input detection error. Accordingly, there is a need of excluding the unintended finger input factor 30 and performing the correct operations according to a valid input factor by considering the hand gesture of the user in generating the normal finger input factor.

A description is made of the coordinate exclusion operation of the terminal 100 according to an embodiment of the present disclosure hereinafter.

Figure 7:
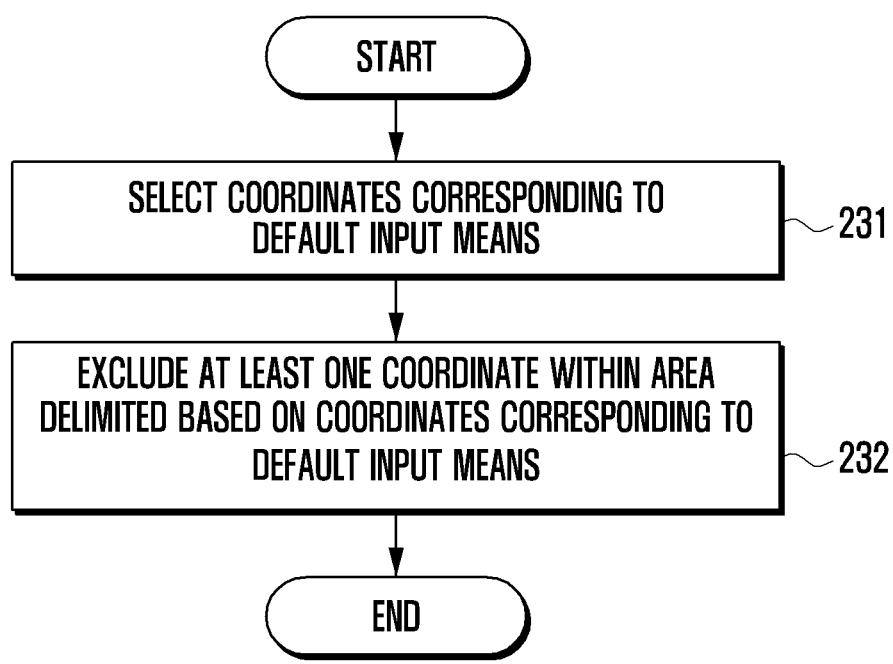
FIG. 7 is a flowchart illustrating a certain coordinates rejecting method according to a first embodiment of the present invention.

Referring to FIG. 7, the terminal 100 selects the coordinates corresponding to the default input means 231. Although the reference input means may change according to the user's configuration, a pen is assumed as the default input means in various embodiments of the present disclosure. The UE 100 selects the coordinates corresponding to the pen as the default input means. If there are plural coordinates corresponding to the reference input means, the UE 100 may select a certain one fulfilling a predetermined condition. For example, the terminal 100 may select the left most coordinate or the bottom most coordinate among the plural coordinates corresponding to the default input means. The criteria for the terminal 100 to select a coordinate is not limited.

Next, the UE 100 excludes at least on coordinate existing in the area delimited based on the coordinates corresponding to the default input means at operation 232.

Figure 8:
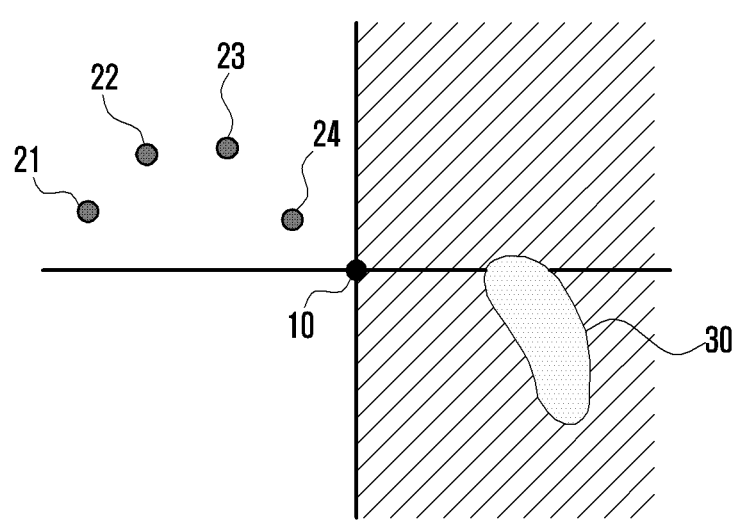
FIG. 8 is a diagram illustrating a principle of excluding unintended input factor according to an embodiment of the present invention.

The terminal 100 is capable of rejecting the coordinates of at least one input factor occurred at left or right side of a specific input factor generated by the specific one input means. Whether to exclude the left side or to reject the right side is determined according to the user configuration of the terminal. The user can set the user configuration by one of a right mode or a left mode according to whether the user is a right-handed or a left-handed. For example, as shown in FIG. 8, when the user is right-handed, the user configuration is set by a right mode that rejects a coordinates occurred at right side of the input factor 30. In this manner, the terminal 100 is capable of excluding the unintended input factors and identifying the multipoint input with the combination of the valid finger and pen input factor 10, thereby discriminating among the user-intended multipoint inputs as combination of at least one of finger and pen input factors efficiently.

Figure 9:
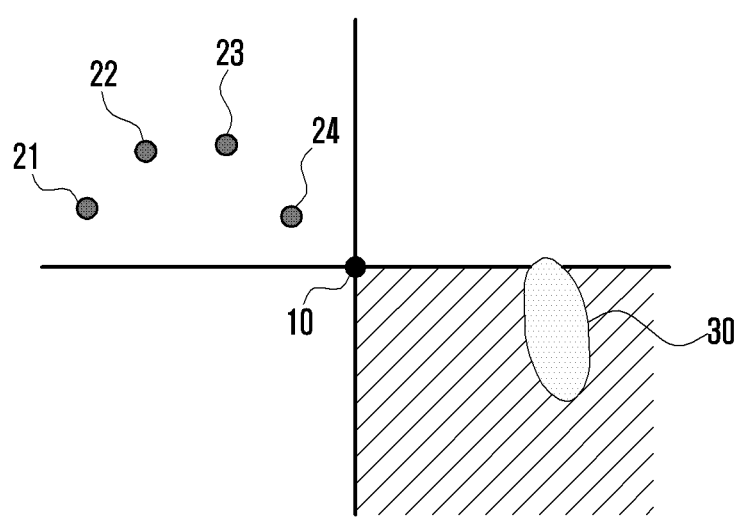
FIG. 9 is a diagram illustrating a principle of excluding unintended input factor according to another embodiment of the present invention.

To achieve above, the terminal 100 can be configured to exclude at least one input factor occurred at one of the quadrants formed by the two axes crossing at a point, as the origin of a 2 dimensional plane, corresponding to the input factor generated by the criterion input means. The quadrant in which the input factors are ignored can be determined by the terminal configuration or the user. In the terminal is operating as a right handed mode as shown in FIG. 9, the terminal 100 is capable of configured to exclude at least one input factor occurred at one of the quadrants formed by the two axes crossing at a point, a the origin of a 2 dimensional plane, corresponding to the input factor generated by the criterion input means. At this time, the terminal 100 forms a 2-dimensional plane having the point where the pen input factor has been generated as its origin to exclude the input factors occurred in one of the quadrants defined by two axes crossing the origin. Thus, the terminal 100 is capable of forming a 2-dimensional plane having the position of the pen input factor 10 as its origin and ignoring the unintended input factor 30 detected at one of the quadrants of the 2-dimensional plane.

A description is made of the coordinate exclusion operation of the terminal 100 according to another embodiment of the present disclosure hereinafter.

Figure 10:
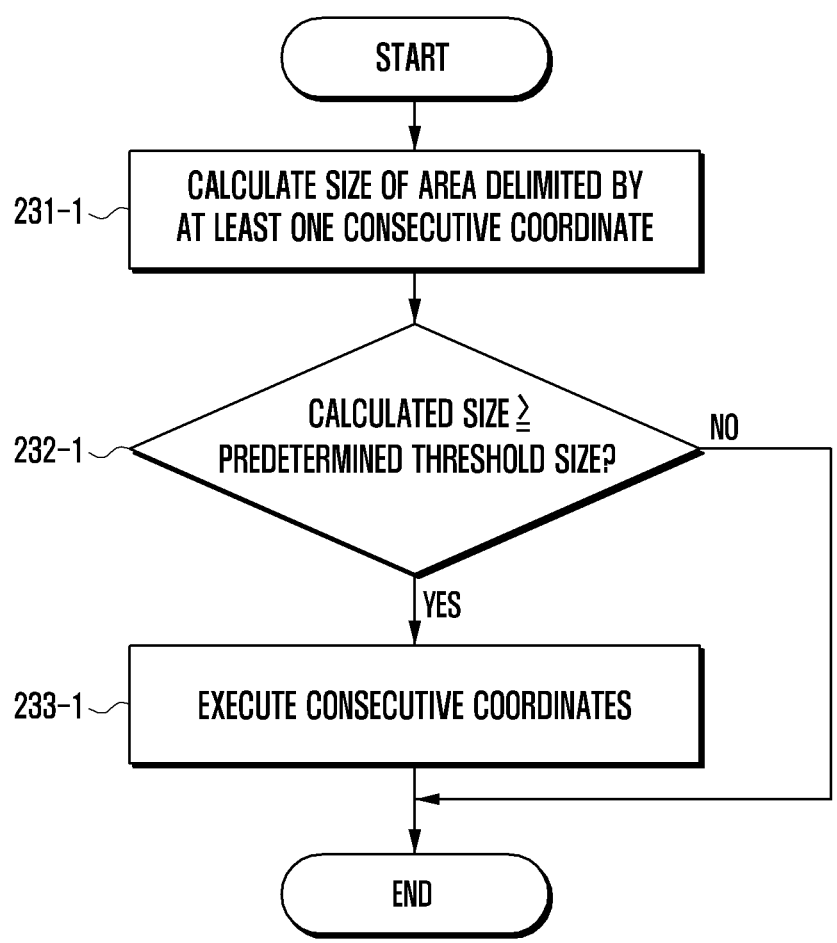
FIG. 10 is a flowchart illustrating a certain coordinates rejecting method according to a second embodiment of the present invention.

Referring to FIG. 10, the UE calculates the size of the area delimited by at least one consecutive coordinate among the extracted coordinates at operation 231-1. The UE determines whether the distance between neighboring coordinates is equal to or less than a predetermined threshold value to judge the consecutiveness of the corresponding coordinates. In the case of detecting the input using a sensor pad in the form of a grid, if at least one coordinate is extracted from consecutive cross points of the grid, the terminal 100 may determine the corresponding coordinates as consecutive coordinates. The terminal calculates the size of the area using the consecutive coordinates.

Next, the UE 100 determines whether the calculated size is equal to or greater than a predetermined threshold size at operation 232-1.

Figure 11:
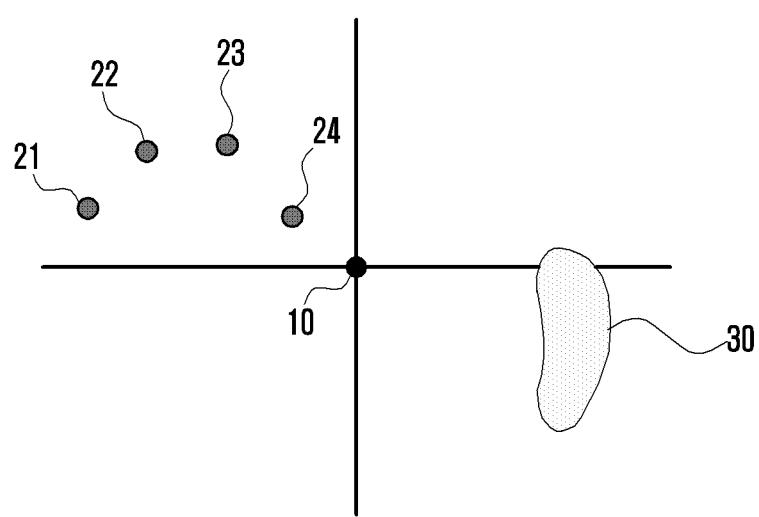
FIG. 11 is a diagram illustrating a principle of excluding unintended input factor according to still another embodiment of the present invention.

Alternatively, the terminal 100 is capable of excluding at least one of coordinates forming a size equal to or greater than a predetermined threshold size. The threshold size can be set by the user or pre-stored in the terminal 100 at the manufacturing state of the terminal 100. The threshold size can be determined in consideration of the size of the hand or physical object that is likely to contact the terminal 100 unnecessarily and the size of the contactable plane. In the exemplary case of FIG. 11, the terminal 100 is capable of detecting the finger input factors 21 to 24, pen input factor 10, and unintended finger input factor 30. As shown, the unintended finger input factor 30 can be composed of multiple input points. These points have a large number of coordinates continuous in all directions and form an area by drawing a closed curve connecting the outer points of all directions. If the area is larger than the threshold size, the terminal 100 regards the input factor as unintended input factor and excludes the coordinates corresponding to the unintended input factor.

In another alternate embodiment, if a multipoint input consisted of multiple input factors occurred by multiple input means (or sensed on the multiple input pads) is detected, the terminal 100 is capable of excluding the coordinates corresponding to at least one input factor sensed on an input pad based on the coordinates of an input factor sensed on a criterion input pad. At this time, the terminal 100 is capable of deactivating a region of the other input pad than the criterion input pad to exclude the input factors occurred thereon such that the input factors occurred in the deactivated region are not reflected in generating the multipoint input signal.

For exampe, the terminal 100 is capable of excluding the unintended finger input factor 30 among the finger input factors 21 to 24 and 30 that are sensed by the first input pad 110*a* on the basis of the coordinates of the pen input factor 10 sensed by the second input pad 110*b*. The terminal 100 is capable of ignoring the coordinates constituting the unintended finger input factor 30 sensed at the right side of the of the pen input factor 10 in reference to the vertical axis coordinate of the pen input factor 10 as shown in FIG. 8. At this time, the terminal 100 is capable of deactivating a region for excluding the input factors occurred on the first pad 110*a* such that the finger input factors occurred in the deactivated region are not reflected in generating the multipoint input signal.

Next, the terminal 100 determines whether there is an operation corresponding to the coordinates at step 240.

The terminal 100 determines, based on the extracted coordinates without the excluded unintended input factors, whether there is an operation corresponding to the coordinates.

The terminal 100 is also capable of storing the information on the operations corresponding to the extracted coordinates. The terminal 100 is also capable of storing the information on the program/application name, execution file path, related image, icon, UI, etc. Here, the terminal 100 is capable of storing the coordinates as a value indicating a threshold range rather than a specific value.

The operation corresponding to the coordinates according to the embodiment of the present invention is the operation assigned for the multipoint input generated by multiple input means and thus differs from the operation assigned for the multipoint input generated by a single input means. The operation corresponding to the coordinates can be the operation assigned based on the type of the input means and the number of input factors generated by the input means.

If it is determined that there is an operation corresponding to the coordinates detected in steps 220 and 230, the terminal 100 performs the operation at step 250.

The terminal 100 is capable of performing the operations corresponding to the coordinates, which can be at least one of the operations of copy, shortcut icon presentation, menu presentation, pen/eraser switching, and specific program/application execution.

In one embodiment of the present invention, the terminal 100 can detect movement of each of the input factors constituting the multi point input, namely drag. In this case, the terminal 100 can track the movement of each of the input factors by extracting the coordinates of each of the moving input factors repetitively. Also, the terminal 100 can exclude at least one of the extracted coordinates of the moving input factors as explained above. The terminal 100 can determine at least one of moving direction, moving distance and whether each of the input factors moves away from each other or moves close to each other.

Further, the terminal 100 is capable of performing an operation corresponding to the movement of the input factors. The terminal 100 is capable of determining whether there is an operation corresponding to the movement of the input factors. When there is an operation corresponding to the movement of the input factors, the terminal 100 performs the operation. The operations corresponding to the coordinates can be at least one of the operations of zoom-in, zoom-out, drag, and specific program/application execution.

Figure 12:
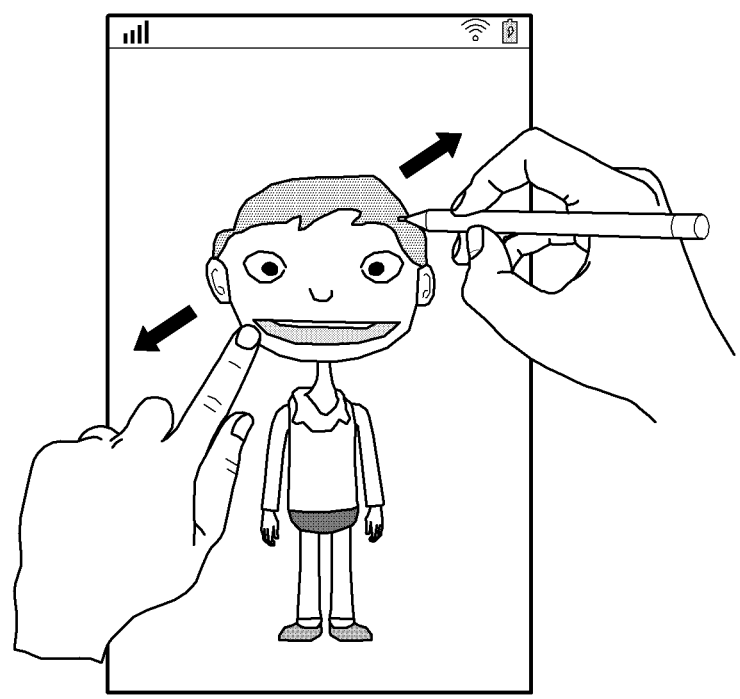
FIG. 12 is a diagram illustrating a principle of executing an operation in response to the multipoint input in the multipoint input processing method according to an embodiment of the present invention.

For example, the terminal 100 is capable of performing a zoom-in or zoom-out operation as the operation corresponding to the movement. Referring to FIG. 12, the terminal 100 detects a multipoint input consisted of a finger input factor and a pen input factor and extracts the coordinates of these input factors of the multipoint input. The terminal 100 is capable of excluding the finger input factor occurred at the right side of the pen input factor according to the current terminal configuration. As shown, the terminal 100 is capable of detecting movement of the input factors constituting multipoint input becoming distant from each other. The movement becoming distant from each other (or closer to each other) can occur by the movement of at least one of the input factors.

Referring to FIG. 12, the terminal 100 is capable of producing a zooming effect on the screen according to the movement of the input factors of the multipoint input. In the case that the coordinates of the finger and pen input factors change outwardly in the course of being close with each other, the terminal 100 is capable of zooming out the screen through manipulating the finger and stylus in various ways. For example, as shown in FIG. 12, a user can contact a particular location on a touch screen with a left index finger and move outwardly, simultaneously move both the left finger and the stylus pen outwardly on the screen, or pointing the left index finger on the screen in a stationary position and moving the stylus pen pointer outwardly to achieve the zooming effect. It should be noted that in the illustrative examples shown in FIG. 12, the stylus pen may or may not contact the touch screen when operating in conjunction with the left finger touch input during operation.

Figure 13:
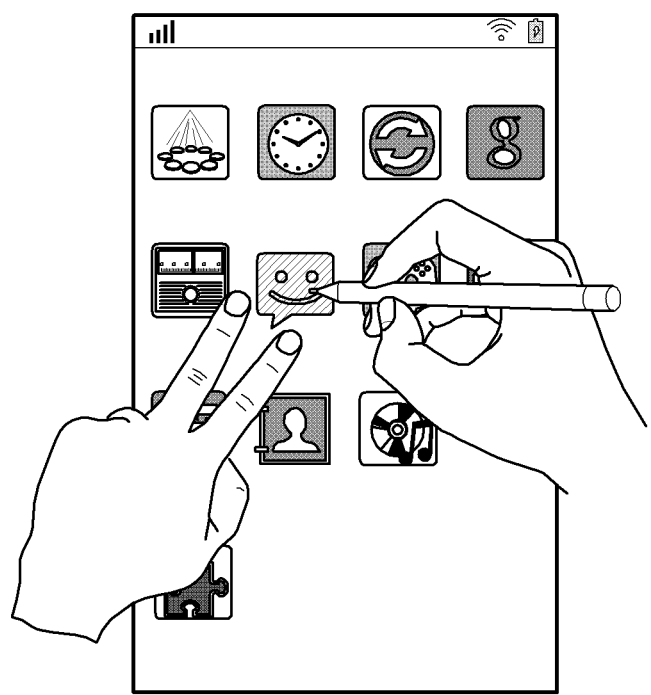
FIG. 13 is a diagram illustrating a principle of executing an operation in response to the multipoint input according to another embodiment of the present invention.

Referring to FIG. 13, the terminal 100 is further capable of performing the operation corresponding to the coordinates such as selection, drag, or copy of an object. As shown, the terminal 100 is capable of detecting the multipoint input consisted of finger and pen input factors occurring simultaneously or sequentially and extracting the coordinates of the input factors. The terminal 100 is capable of excluding the coordinates of the finger input factors detected at the right side of the pen input factor according to the teachings explained with reference to FIGS. 4 through 10. Accordingly, the terminal 100 is capable of determining two finger input factors and one pen input factor as valid input factors of the multipoint input. In this embodiment, the operation corresponding to the two finger input factors on the screen serves to select at least one content pointed by the stylus pen. Alternatively, pointing two fingers around a desired item or icon and/or while pointing to the desired item or icon with the stylus pen would serve the same selection.

Through above multipoint input, the terminal 100 is capable of selecting a desired content item such as icon and photo corresponding to the coordinates of the stylus pen to enable the selected item to be moveable. Here, the terminal 100 is capable of detecting the movement of the pen input factor in the state where the two finger input factors are maintained on the screen and extracting the coordinates of the moving stylus pen in real time. Hence, the terminal 100 is capable of moving the selected content item corresponding to the movement of the stylus pen when two finger contact inputs are maintained on the screen. The terminal 100 is also capable of copying and pasting the selected content item corresponding to the movement of the pen input factor. For example, as shown in FIG. 13, a user can point to a desired item or icon by placing two finger contacts around the item or icon or by merely maintaining two finger contacts on the screen and then drag the desired item or icon using the stylus pen to a particular location. Upon release of the stylus pen on the particular location, the pasting of the item or icon can occur. It should be noted that in the illustrative examples shown in FIG. 13, the stylus pen may or may not contact the touch screen when operating in conjunction with the two left finger touch inputs during operation.

Figure 14:
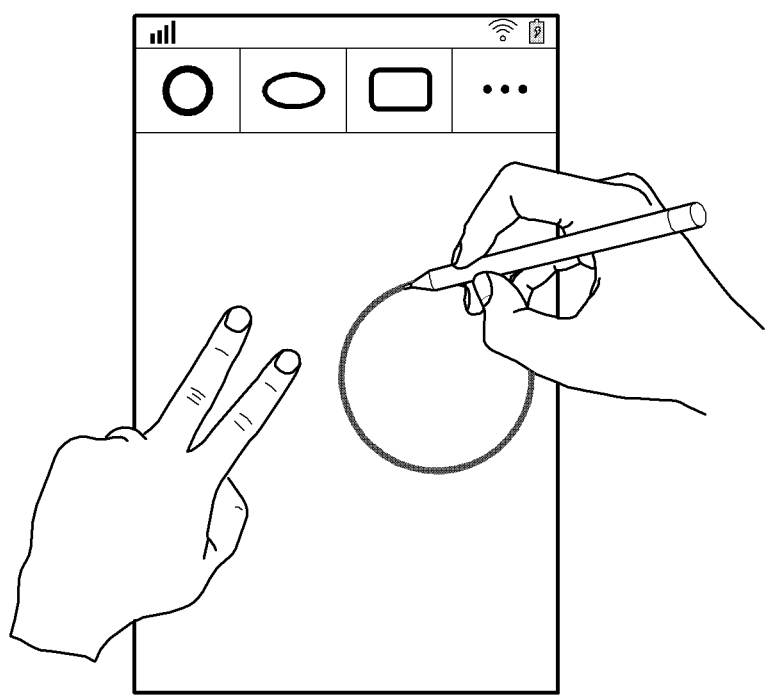
FIG. 14 is a diagram illustrating a principle of executing an operation in response to the multipoint input according to another embodiment of the present invention.

Referring to FIG. 14, the terminal 100 is further capable of displaying the shortcut icon or menu as the operation corresponding to the input factors.

For example, the terminal 100 can determine a shape made or defined by a moving stylus pen on the screen thereof. The shape can be various images such as human, house, tree, square, triangle, star, etc. The terminal 100 pre-store a plurality of short cut menus containing similar images in the storage unit 130 or downloaded from a server. Thus, upon detecting the shape drawn by a user on the screen, the terminal 100 can retrieve and display at least one pre-stored shortcut menu having a substantially a similar shape of the detected shape drawn by the user.

Here, the terminal 100 is capable of detecting the multi-point input consisted of the two fingers and pen input factors occurred simultaneously or sequentially and extracting the coordinates of the input factors. Here, the terminal 100 is capable of excluding the coordinates of the finger input factors occurred at the right side of the pen input factor according to the configuration state. Accordingly, the terminal 100 is capable of determining two finger input factors and one pen input factor as valid input factors.

As shown in FIG. 14, the operation corresponding to the two finger input factors on the screen is to display icons representing various forms of image corresponding to a following movement of the pen input factor, while maintaining the two finger input factors. To this end, the terminal 100 can determine a shape made or defined by a moving stylus pen on the screen thereof. The shape can be various images such as human, house, tree, square, triangle, star, etc. The terminal 100 pre-store a plurality of short cut menus containing similar images in the storage unit 130 or downloaded from a server. Thus, upon detecting the shape drawn by a user on the screen, the terminal 100 can retrieve and display at least one pre-stored shortcut menu having a substantially a similar shape of the detected shape drawn by the user.

In FIG. 14, the shape of the movement of the pen input factor is similar to a circle, thus the terminal 100 in turn extracts at least one short cut or menu containing a circle shape detected on the screen and then display the extracted short cut or menu on the screen. Note that the terminal 100 is capable of displaying the short cut or menu at one of the top, bottom, left, and right sides of the screen. Alternatively, the terminal 100 is capable of displaying the short cut or menu in the form of a popup window or a slide bar.

Thereafter, when one of the at least one image of the short cut or menu is selected by a user, the terminal 100 is capable of displaying an image corresponding to the selected icon at the position where the pen input factor is detected.

Figure 15:
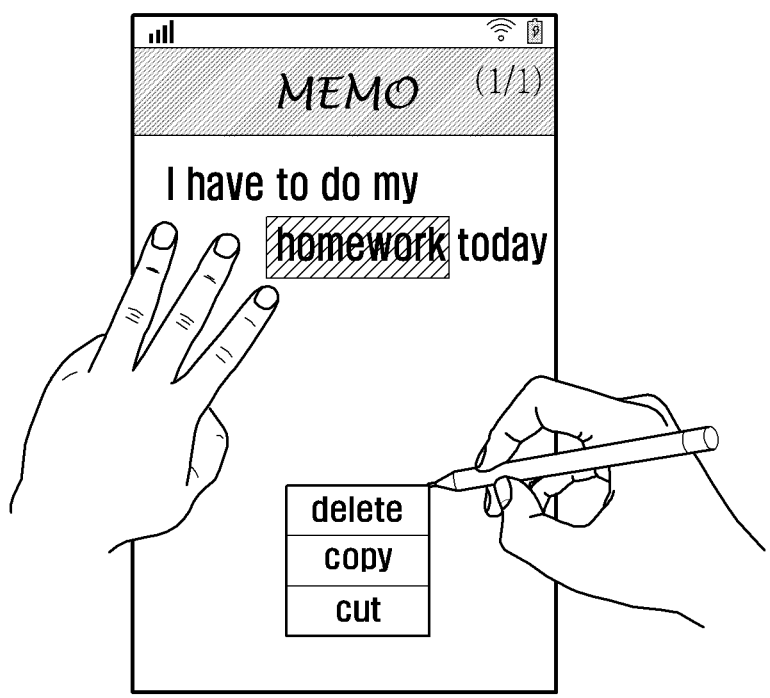
FIG. 15 is a diagram illustrating a principle of executing an operation in response to the multipoint input according to yet another embodiment of the present invention.

Referring to FIG. 15, the terminal 100 can further extract and display a predetermined menu including save, edit, delete, and etc. for different application based on different multi-touch input. As shown, the terminal 100 is capable of detecting a multipoint input including three fingers and a stylus pen occurring simultaneously or in sequence and extracting the coordinates of the input factors. Here, the terminal 100 is capable of excluding the coordinates of the finger input factors detected at the right side of the pen input factor according to the teachings explained with reference to FIGS. 6 through 10. Accordingly, the terminal 100 is capable of determining three finger input factors and one pen input factor as valid input factors. In this embodiment, after highlighting or selecting a desired item or content displayed on the screen, the operation corresponding to the three finger input factors serves to display a menu at the position where the stylus pen is pointing on the screen. For example, as shown in FIG. 15, the terminal 100 is capable of displaying a menu including the menu items for document editing operations such as deletion, copy, and cut. Thereafter, the user can select a desired command after the menu is displayed on the screen where the stylus pen is pointing. Alternatively, the terminal 100 is capable of displaying the menu in the form of a popup window or a slide bar or a circular window around the coordinates of the pen input factor, a scroll box, or a movable box.

Note the type of menu corresponding to the three finger input factors can be pre-assigned by a user or terminal designer for different application commands or can be selectively changed by the user. Accordingly, it should be noted that the teaching of the above can be applied to realize other different command functions not shown. For example, the terminal 100 is also capable of performing pen-switching operation, pen/eraser switching operation, pen color switching operation, pen thickness switching, etc. using different menu to be displayed on the screen in response to the same multi-touch finger input when it operates in memo or drawing mode. Further, the terminal 100 is also capable of displaying commands relating to executing a program, application, or service in form of menu shown in FIGS. 14 and 15, and the user can select a desired command after the menu is displayed on the screen.

Further, it should be noted that the terminal operation corresponding to the coordinates is not limited to the above enumeration but can include various equivalents without departing from the scope of the present invention. For illustrative purposes, drawings depicted a left hand contacting the touch screen and a right hand holding a stylus type pen, but it should be noted that the teachings of the present invention is also applicable to different hand arrangement such as a left hand holding the pen during operation while the right fingers contacts the screen. Also, different number or combination of fingers can be contacted on the screen to realize the same effect as shown in the drawings.

As described above, the terminal and method for processing a multipoint input is provided with multiple input pads for detecting the input factors caused by different types of input means such that the user is capable of inputting various commands generated according to different combination of the multiple input factors by the different types of input means, thus improving user convenience and terminal utilization.

Also, the terminal and method for processing a multipoint input is capable of detecting a multipoint input consisted of multiple input factors occurred by at least one input means and excluding unintended input factors, thus improving the detection accuracy of multipoint inputs.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for processing a multipoint input, comprising:
    detecting a coordinate generated by a first input device and a plurality of coordinates generated by a second input device;
    defining a plurality of screen regions by forming two axes intersecting at the coordinate generated by the first input device, each screen region defined by the two axes and the plurality of screen regions including at least a given region in which inputs are ignored;
    excluding, based on being located in the given region from the plurality of screen regions, at least one coordinate of the plurality of coordinates generated by the second input device;
    performing an operation based on detected coordinates after the at least one coordinate of the plurality of coordinates generated by the second input device is excluded from the detected coordinates,
    determining that the plurality of coordinates are consecutive coordinates designating a touch input area when distances between respective pairs of the plurality of coordinates are less than or equal to a predetermined threshold distance; and
    if the touch input area is greater than the predetermined threshold distance, ignoring the plurality of coordinates generated by the second input device.

2. The method of claim 1, wherein the coordinate generated by the first input device and the plurality of coordinates generated by the second input device are based on input events that occur simultaneously or sequentially.

3. The method of claim 1, further comprising selecting the given region as one in which input detected using the second input device is ignored based on a position of the given region relative to the coordinate generated by the first input device.

4. The method of claim 1, wherein defining the plurality of screen regions includes dividing the screen into a set of quadrants.

5. The method of claim 1, wherein the plurality of coordinates generated by the second input device are detected based on interactions between the second input device and a user's hand.

6. The method of claim 1, wherein each of the first input device and the second input device includes a different type of touch panel.

7. The method of claim 1, wherein the coordinate generated by the first input device and the plurality of coordinates generated by the second input device are detected based on signals received from the first input device and the second input device.

8. The method of claim 1, wherein the coordinate generated by the first input device is generated based on an interaction between the first input device and a stylus.

9. The method of claim 1, wherein the operation comprises at least one of zoom-in, zoom-out, drag, copy, shortcut icon presentation, menu presentation, pen/eraser switching, and program execution operations.

10. A terminal comprising:
    a first input device and a second input device; and
    a controller configured to:
    detect a coordinate generated by the first input device and a plurality of coordinates generated by the second input device;
    define, in a screen, a plurality of screen regions by forming two axes intersecting at the coordinate generated by the first input device, each screen region defined by the two axes and the plurality of screen regions further including at least a given region in which inputs are ignored;

exclude, based on being located in a given region from the plurality of screen regions, at least one coordinate of the plurality of coordinates generated by the second input device;

perform an operation based on detected coordinates after the at least one coordinate of the plurality of coordinates generated by the second input device is excluded from the detected coordinates, determine that the plurality of coordinates are consecutive coordinates designating a touch input area when distances between respective pairs of the plurality of coordinates are less than or equal to a predetermined threshold distance; and if the touch input area is greater than the predetermined threshold distance, ignore the plurality of coordinates generated by the second input device.

11. The terminal of claim 10, wherein the coordinate generated by the first input device and the plurality of coordinates generated by the second input device are based on input events that occur simultaneously or subsequently.

12. The terminal of claim 10, wherein the each of the first input device and the second input device includes a different type of touch panel.

13. The terminal of claim 12, wherein the coordinate generated by the first input device and the plurality of coordinates generated by the second input device are detected based on signals received from the first input device and the second input device.

14. The terminal of claim 12, wherein the coordinate generated by the first input device is generated based on an interaction between the first input device and a stylus.

15. The terminal of claim 10, wherein the operation comprises at least one of zoom-in, zoom-out, drag, copy, shortcut icon presentation, menu presentation, pen/eraser switching, and program execution operations.

16. The terminal of claim 10, wherein the plurality of coordinates generated by the second input device are detected based on interactions between the second input device and a user's hand.

17. The terminal of claim 10, wherein the controller is further configured to select the given region as one in which input detected using the second input device is ignored based on a position of the given region relative to the coordinate generated by the first input device.

18. The terminal of claim 10, wherein defining the plurality of screen regions includes dividing the screen into a set of quadrants.

* * * * *